United States Patent
Huang et al.

(10) Patent No.: US 9,698,721 B2
(45) Date of Patent: Jul. 4, 2017

(54) AC MOTOR DRIVING SYSTEM AND METHOD THEREOF

(71) Applicant: RHYMEBUS CORPORATION, Taichung (TW)

(72) Inventors: Ming-Shi Huang, New Taipei (TW); Chang-Ming Wang, Taipei (TW); Kuan-Cheng Chen, Tainan (TW); Ming-Chang Chou, Taichung (TW)

(73) Assignee: RHYMEBUS CORPORATION, Taichung (TW)

(*) Notice: Subject to any disclaimer, the term of this patent is extended or adjusted under 35 U.S.C. 154(b) by 0 days.

(21) Appl. No.: 14/877,943

(22) Filed: Oct. 8, 2015

(65) Prior Publication Data
US 2016/0294316 A1 Oct. 6, 2016

(30) Foreign Application Priority Data
Mar. 31, 2015 (TW) .............................. 104110503 A (51) Int. Cl.
*H02P 1/00* (2006.01)
*H02P 27/08* (2006.01)

(52) U.S. Cl.
CPC .................................. *H02P 27/08* (2013.01)

(58) Field of Classification Search
CPC .................................................. A61B 17/1626
USPC ........................................ 318/504, 34, 558
See application file for complete search history.

(56) References Cited

U.S. PATENT DOCUMENTS

| | | | |
|---|---|---|---|
| 6,781,333 B2* | 8/2004 | Koide ..................... | H02P 21/00 318/432 |
| 8,148,937 B2* | 4/2012 | Itoh ..................... | H02P 21/0089 123/179.5 |
| 8,749,184 B2* | 6/2014 | Atarashi ................. | H02P 27/06 318/139 |
| 2013/0154531 A1 | 6/2013 | Furutani et al. | |

FOREIGN PATENT DOCUMENTS

| | | |
|---|---|---|
| CN | 101910524 A | 12/2010 |
| CN | 103732431 A | 4/2014 |
| JP | 2009219241 A | 9/2009 |
| TW | 201034354 A | 9/2010 |

* cited by examiner

*Primary Examiner* — David S Luo
(74) *Attorney, Agent, or Firm* — CKC & Partners Co., Ltd.

(57) ABSTRACT

AC motor driving system and driving method thereof are provided. The driving system and method are capable of increasing power factor, adjusting waveform of the DC ripple voltage for increasing driving efficiency. The driving system is basically constructed by connecting three circuits. The first circuit is a three-phase full wave rectifying circuit and is used to transfer commercial electricity to a first DC voltage. Then, the second circuit is used to transfer the first DC voltage to a second DC voltage that ripples voltage thereof having a semi-sinusoidal waveform. The third circuit is an AC driving circuit, and receives the second AC voltage for driving the AC motor. Thereby, the driving efficiency can be increased. The capacitance used in the present disclosure has low capacitance value, thus the power factor can be increased, and usage time of the AC motor driving apparatus can also be increased.

9 Claims, 8 Drawing Sheets

AC MOTOR DRIVING SYSTEM AND METHOD THEREOF

RELATED APPLICATIONS

This application claims priority to Taiwan Application Ser. No. 104110503 filed Mar. 31, 2015, which is herein incorporated by reference.

BACKGROUND

Technical Field

The present disclosure relates to an AC motor driving method and an AC motor driving system. More particularly, the AC motor driving method and the AC motor driving system of the present disclosure have a capacitor having a small capacitance value.

Description of Related Art

Figure 1:
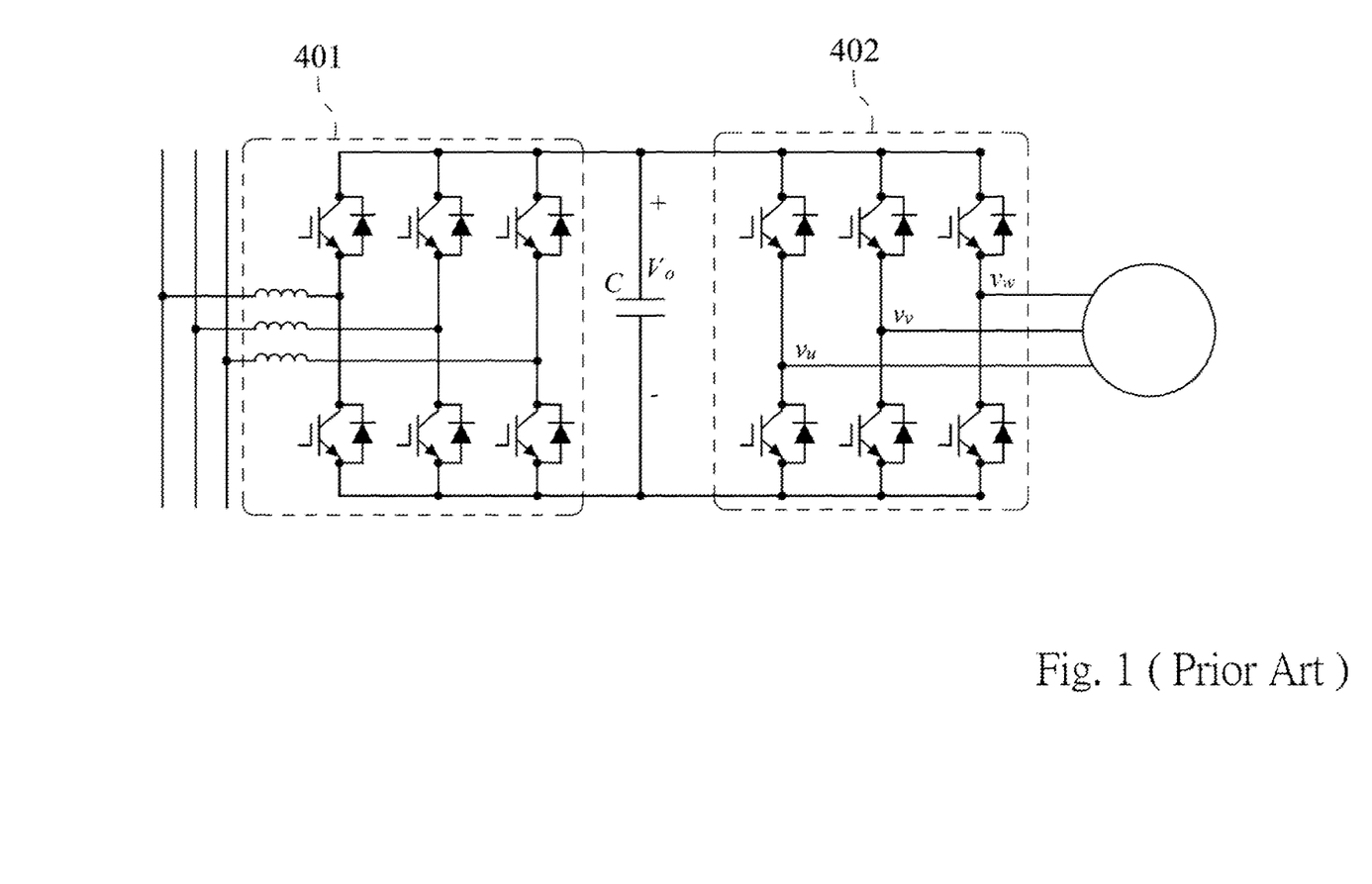
FIG. 1 is a schematic view showing a conventional three-phase AC motor driving system with two-stage circuits.
Figure 2:
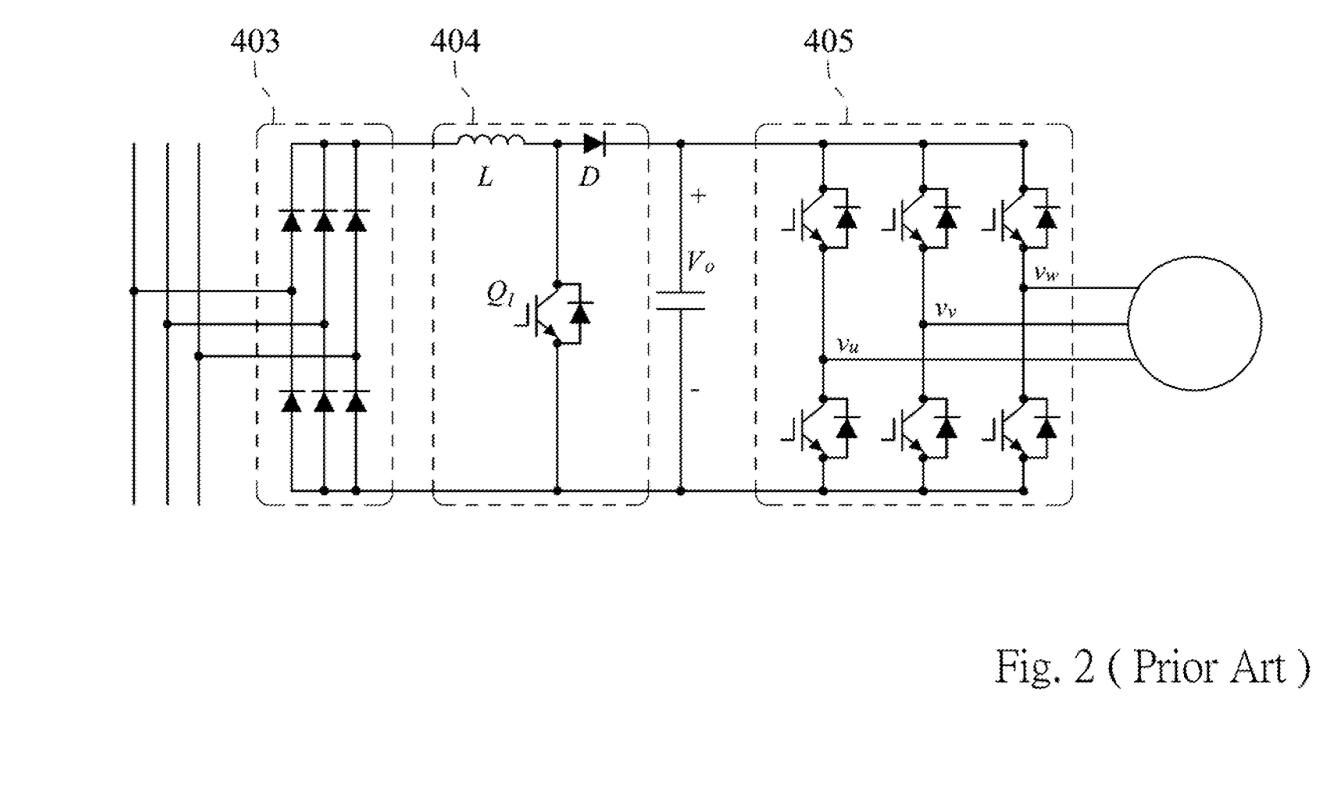
FIG. 2 is a schematic view showing a conventional three-phase AC motor driving system with three-stage circuits.

An industrial motor drive device is designed to obtain a wide constant power operation, low output voltage and current harmonic, high power density and low cost. The commonly used methods can be summarized as follows. One is the field-weakening control that reduces the motor magnetic flux, and the other is DC voltage boosting under the same input supply voltage. The DC voltage boosting is simpler, more effective and can improve the power quality, but the cost is too high. FIG. 1 is a schematic view showing a conventional three-phase AC motor driving system with two-stage circuits. In FIG. 1, a step-up AC-DC converter 401 is in series with an AC driving circuit 402. The step-up AC-DC converter 401 combined with the AC driving circuit 402 can provide bi-directional control of power flow, high power factor and high step-up ratio DC voltage, but the main drawback is its high cost. FIG. 2 is a schematic view showing a conventional three-phase AC motor driving system with three-stage circuits. In FIG. 2, a step-up circuit 404 is in series with a three-phase full-wave rectifier circuit 403 and an AC driving circuit 405. This conventional three-phase AC motor driving system with three-stage circuits can provide high power factor and high step-up ratio DC voltage, and its cost is lower than the system in FIG. 1.

In FIGS. 1 and 2, a capacitor C having a larger capacitance value is used, and enhancing the efficiency of the motor driving system is not considered in FIGS. 1 and 2. Since the capacitor C is used as a filter and usually is an electrolytic capacitor with large capacitance. Its lifetime duration often decreases because of the evaporated electrolyte. Except for that, the power transistors of the AC driving circuit are operated independently and have no interaction to the other stage circuits. An integrated AC motor driving system and method providing higher power factor, higher efficiency and longer lifetime is still commercially desirable.

SUMMARY

According to one aspect of the present disclosure, an AC motor driving method is provided. The method includes, a mains supply is rectified to a first DC voltage via a three-phase full-wave rectifier circuit. The first DC voltage is supplied to a step-up/step-down circuit and a voltage controller, and the step-up/step-down circuit is controlled by the voltage controller to generate a second DC voltage having a semi-sinusoidal waveform. The second DC voltage is supplied to the voltage controller. An electrical angle is generated by an AC motor controller, and the electrical angle is supplied to a voltage command generator. A voltage command is generated by the voltage command generator, and the voltage command is supplied to the voltage controller. The second DC voltage is compared with the voltage commend by the voltage controller. If the second DC voltage and the voltage command are different, the voltage controller generates a plurality of signals to drive the step-up/step-down circuit for adjusting the second DC voltage to approach the voltage command.

According to another aspect of the present disclosure, an AC motor driving system is provided. The AC motor driving system includes a three-phase full-wave rectifier circuit, a step-up/step-down circuit, an AC motor controller and a voltage commend generator. The three-phase full-wave rectifier circuit is for rectifying a mains supply to a first DC voltage. A step-up/step-down circuit is controlled by a voltage controller to generate a second DC voltage having a semi-sinusoidal waveform. The first DC voltage is supplied to the step-up/step-down circuit, and the second DC voltage is supplied to the voltage controller. An AC motor controller is for generating an electrical angle. A voltage command generator is for generating a voltage command with inputting the electrical angle to it, and the voltage command is supplied to the voltage controller. The second DC voltage is compared with the voltage command by the voltage controller. If the second DC voltage and the voltage command are different, the voltage controller generates a plurality of signals to drive the step-up/step-down circuit for adjusting the second DC voltage to approach the voltage command.

BRIEF DESCRIPTION OF THE DRAWINGS

The present disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 3:
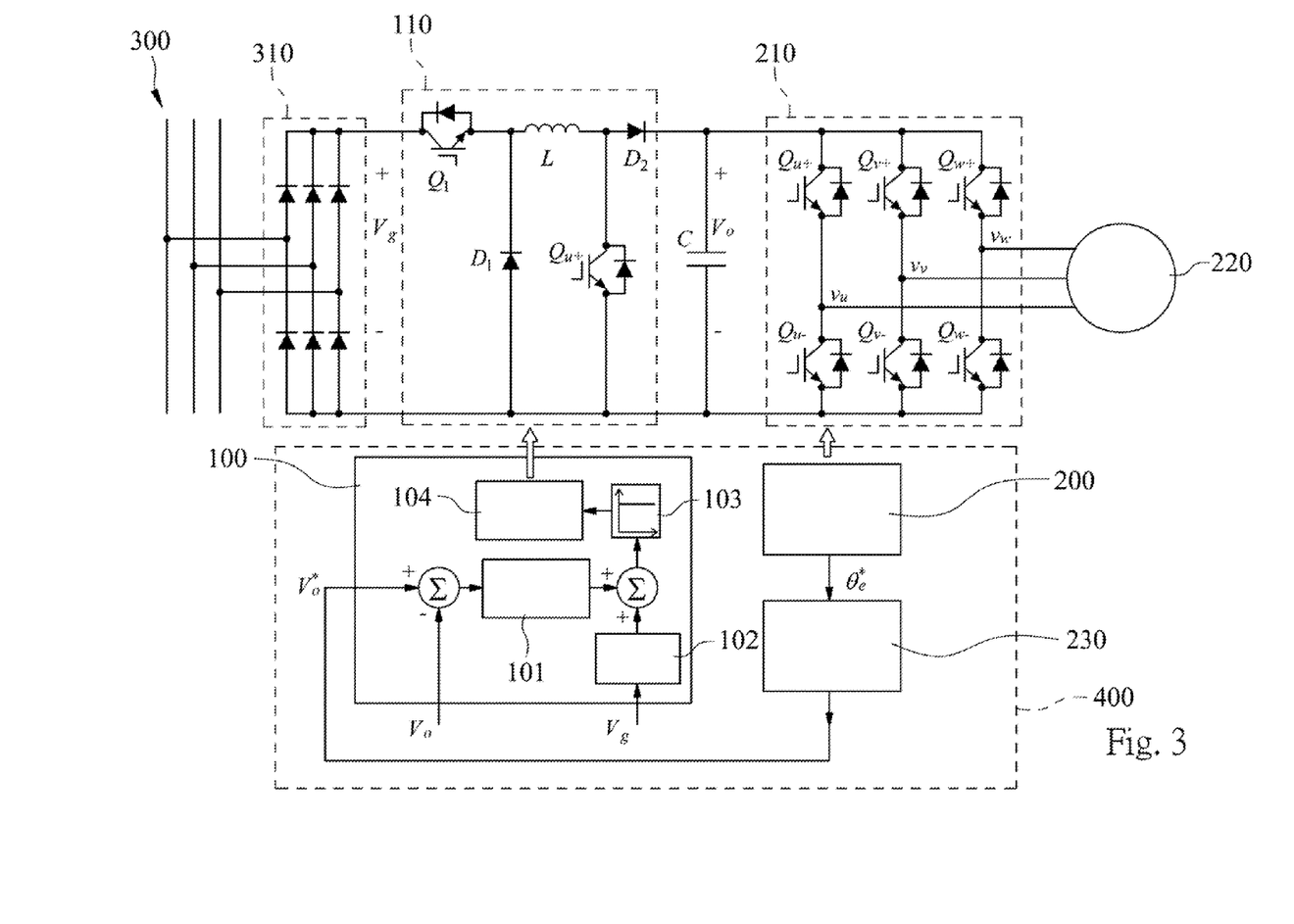
FIG. 3 is a schematic view showing an AC motor driving system according to one embodiment of the present disclosure.
Figure 4:
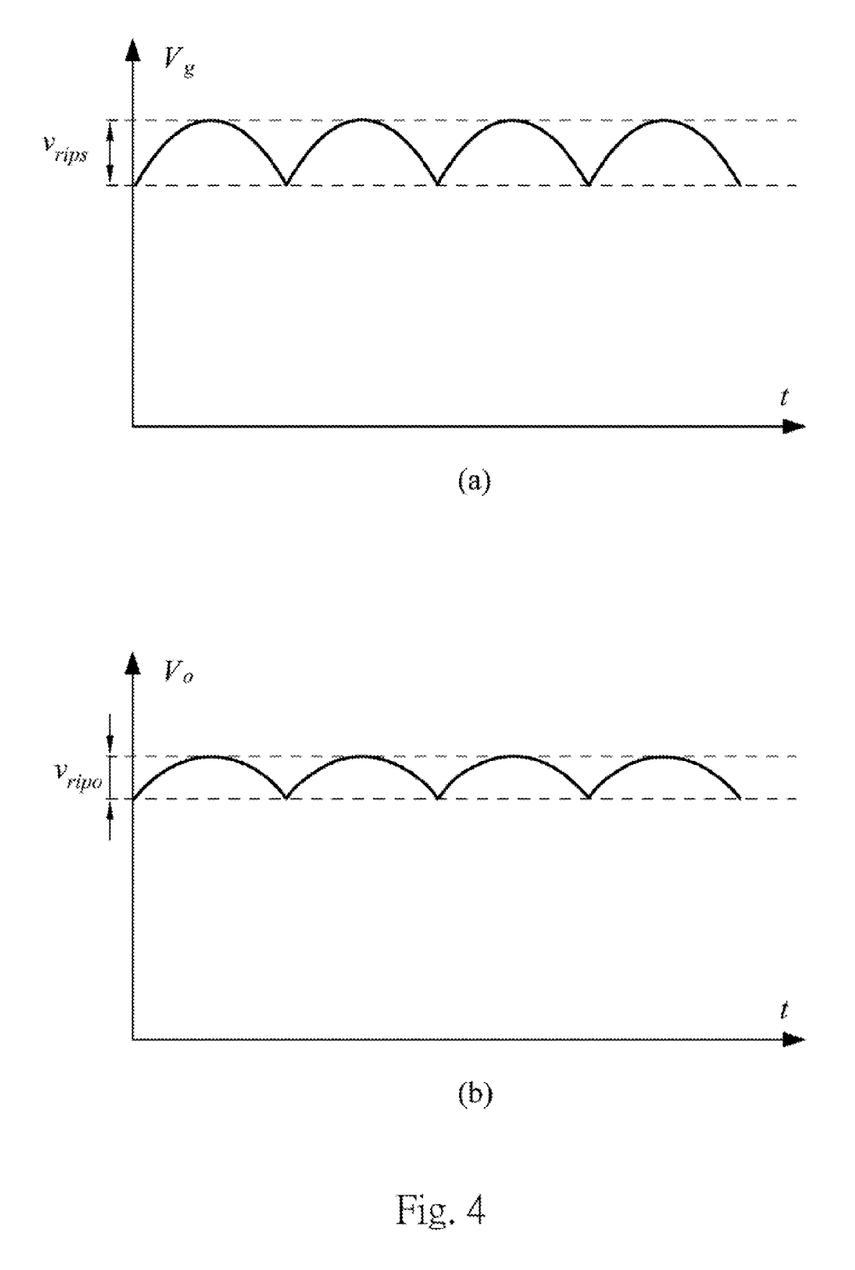
FIG. 4 is a graph showing the first DC voltage and the second DC voltage without the semi-sinusoidal waveform control, for a capacitor having low capacitance value of FIG. 3.
Figure 5:
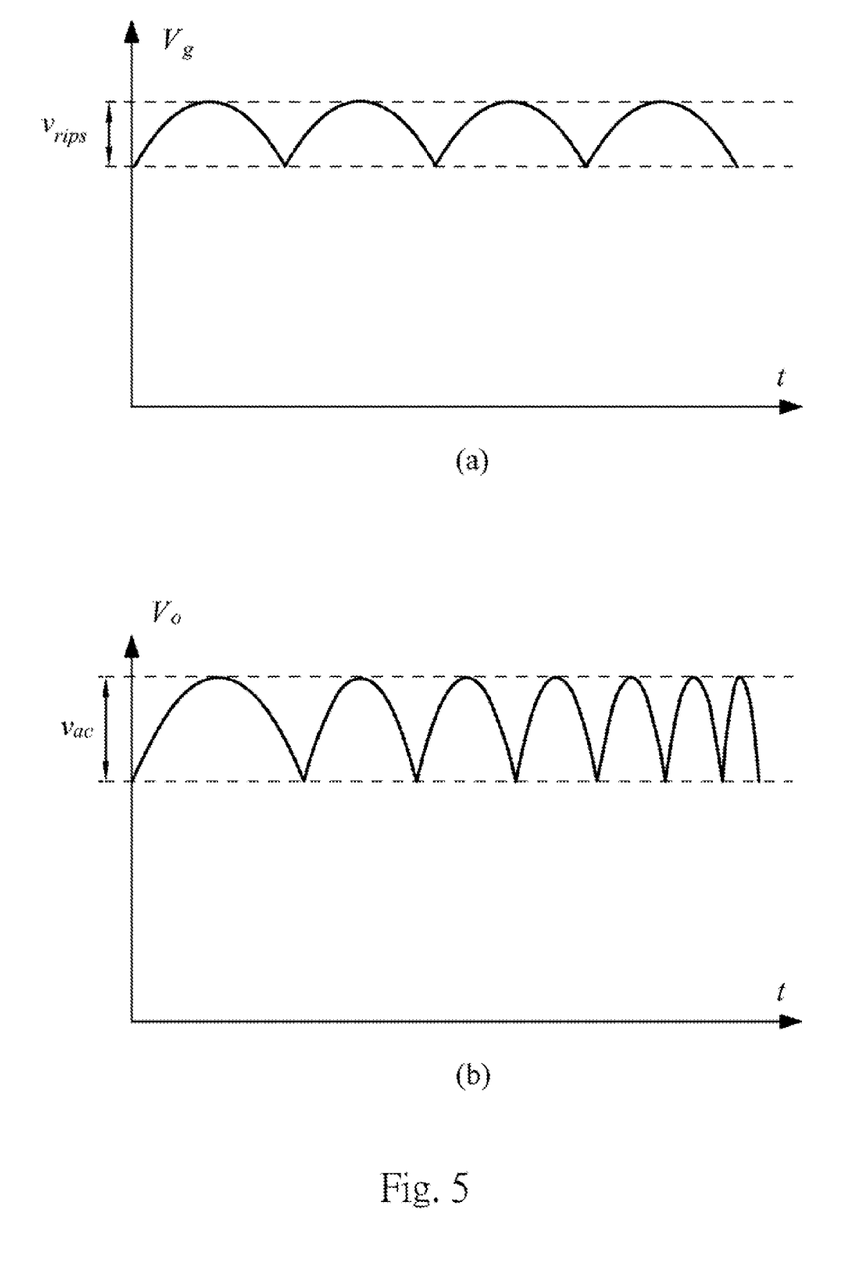
FIG. 5 is a graph showing the first DC voltage and the second DC voltage with the semi-sinusoidal waveform control, for the capacitor having low capacitance value of FIG. 3.

FIG. 3 is a schematic view showing an AC motor driving system according to one embodiment of the present disclosure. FIG. 4 is a graph showing a first DC voltage and a second DC voltage without the semi-sinusoidal waveform control, for a capacitor C having low capacitance value of FIG. 3. FIG. 5 is a graph showing the first DC voltage and the second DC voltage with the semi-sinusoidal waveform control, for the capacitor C having low capacitance value of FIG. 3. These figures illustrate the structure and operation of the following embodiments.

In FIG. 4, the first DC voltage $V_g$ has a ripple amplitude $V_{rips}$, and the second DC voltage $V_o$ has a ripple amplitude $V_{ripo}$. A ripple frequency of the first DC voltage $V_g$ is equal to a ripple frequency of the second DC voltage $V_o$ and is six times the frequency of the mains supply 300. In FIG. 5, the ripple frequency of the second DC voltage $V_o$ is varying according to a required frequency of an AC motor 220. In case of FIG. 5, the frequencies of the second DC voltage ripple and the AC motor 220 are increasing.

The AC motor driving system includes a three-phase full-wave rectifier circuit 310, a step-up/step-down circuit 110, an AC driving circuit 210 and a system controller 400. The system controller 400 includes a voltage controller 100, an AC motor controller 200 and a voltage command generator 230. The three-phase full-wave rectifier circuit 310 is for rectifying the mains supply 300 to the first DC voltage $V_g$. No filter capacitor is used between the three-phase full-wave rectifier circuit 310 and the step-up/step-down circuit 110, so that the ripple frequency of the first DC voltage $V_g$ can be six times the frequency of the mains supply 300, as shown in FIG. 5(a). The step-up/step-down circuit 110 includes a first power transistor $Q_1$ and a second power transistor $Q_2$. The step-up/step-down circuit 110 is controlled by the voltage controller 100 to generate the second DC voltage $V_o$ having a semi-sinusoidal waveform, as shown in FIG. 5(b). The first DC voltage $V_g$ is supplied to the step-up/step-down circuit 110, and the second DC voltage $V_o$ is supplied to the voltage controller 100. The AC driving circuit 210 is controlled by the AC motor controller 200 to drive the AC motor 220. The system controller 400 can be accomplished by a microprocessor. In addition, a capacitor C with low capacitance value can be used between the step-up/step-down circuit 110 and the AC driving circuit 210 to stabilize the second DC voltage $V_o$ and to provide reactive power to the AC motor 220. There is no limitation on the type of the capacitor C, so that a thin film capacitor or any other capacitor with the same effect can be chosen as the capacitor C with low capacitance value.

The voltage controller 100 includes a voltage compensator 101, a feedforward compensator 102, a voltage limiter 103 and a pulse-width signal generator 104. The voltage compensator 101 may be a proportional-integral type, a proportional-integral-derivative type or other types of controller. The frequency response of the voltage controller 100 must be twenty times higher than the frequency of the mains supply 300 to ensure that the second DC voltage $V_o$ can precisely approach a voltage command $V_o^*$. In order to track the voltage command $V_o^*$ having fast varying frequency as shown in FIG. 5(b), the feedforward compensator 102 is used to assist the voltage compensator 101 to improve the second DC voltage $V_o$ tracking performance. The voltage limiter 103 is for clamping the second DC voltage $V_o$ to protect the first power transistor $Q_1$ and the second power transistor $Q_2$ of the step-up/step-down circuit 110.

As mentioned above, the system controller 400 can be accomplished by a microprocessor. In the system controller 400, the commands of speed or torque controls of the AC motor 220 is generated, and the voltage command $V_o^*$ of the voltage controller 100 is generated by the voltage command generator 230. The AC motor controller 200 is for generating an electrical angle $\theta_e^*$ and supplied to the voltage command generator 230 for generating the voltage command $V_o^*$. The voltage command $V_o^*$ is supplied to the voltage controller 100. The voltage controller 100 compares the second DC voltage $V_o$ with the voltage command $V_o^*$ and generates a plurality of signals to drive the step-up/step-down circuit 110. As the result, the second DC voltage $V_o$ will be controlled closed to the voltage command $V_o^*$.

Figure 6:
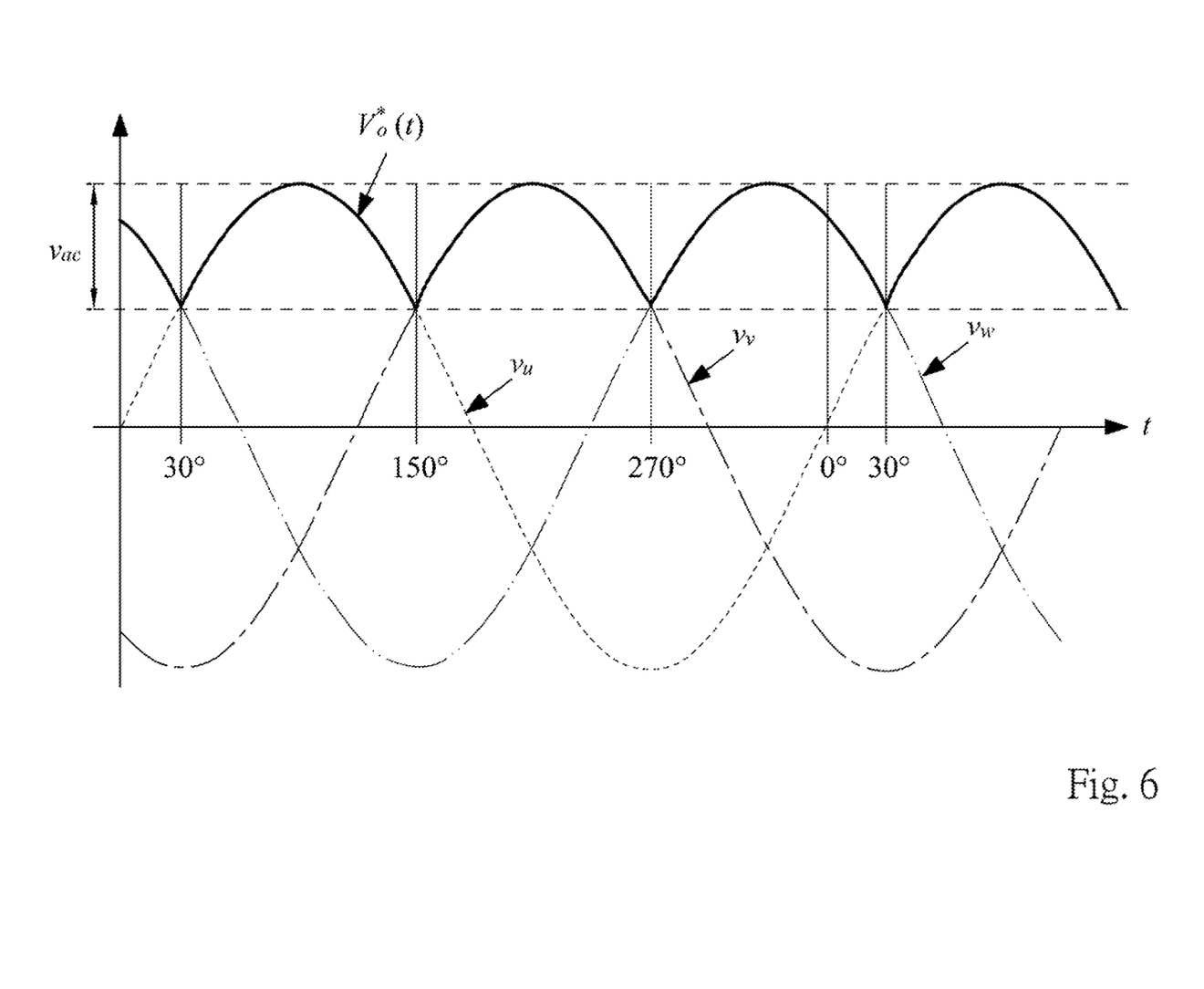
FIG. 6 is a graph showing a voltage command and three-phase voltages with the semi-sinusoidal waveform control, for the capacitor having low capacitance value of FIG. 3.

FIG. 6 is a graph showing the voltage command $V_o^*$ and three-phase voltages $v_u$, $v_v$, $v_w$ with the semi-sinusoidal waveform control, for the capacitor having low capacitance value of FIG. 3. The voltage command generator 230 is for generating the voltage command $V_o^*$ according to the electrical angle $\theta_e^*$ from the AC motor controller 200. The three-phase voltages $v_u$, $v_v$, $v_w$ supplied to the AC motor 220 can be described as follows:

$$v_u = V \sin \theta_e^* \tag{1}$$

$$v_v = V \sin(\theta_e^* - 120°) \tag{2}$$

$$v_w = V \sin(\theta_e^* + 120°) \tag{3}$$

In FIG. 6, the voltage command $V_o^*$ is the maximum value of the three-phase voltages $v_u$, $v_v$, $v_w$ at the same time, so that the voltage command $V_o^*$ is equal to one of the three-phase voltages $v_u$, $v_v$, $v_w$ at phase angles between 30 degrees and 150 degrees.

Figure 7:
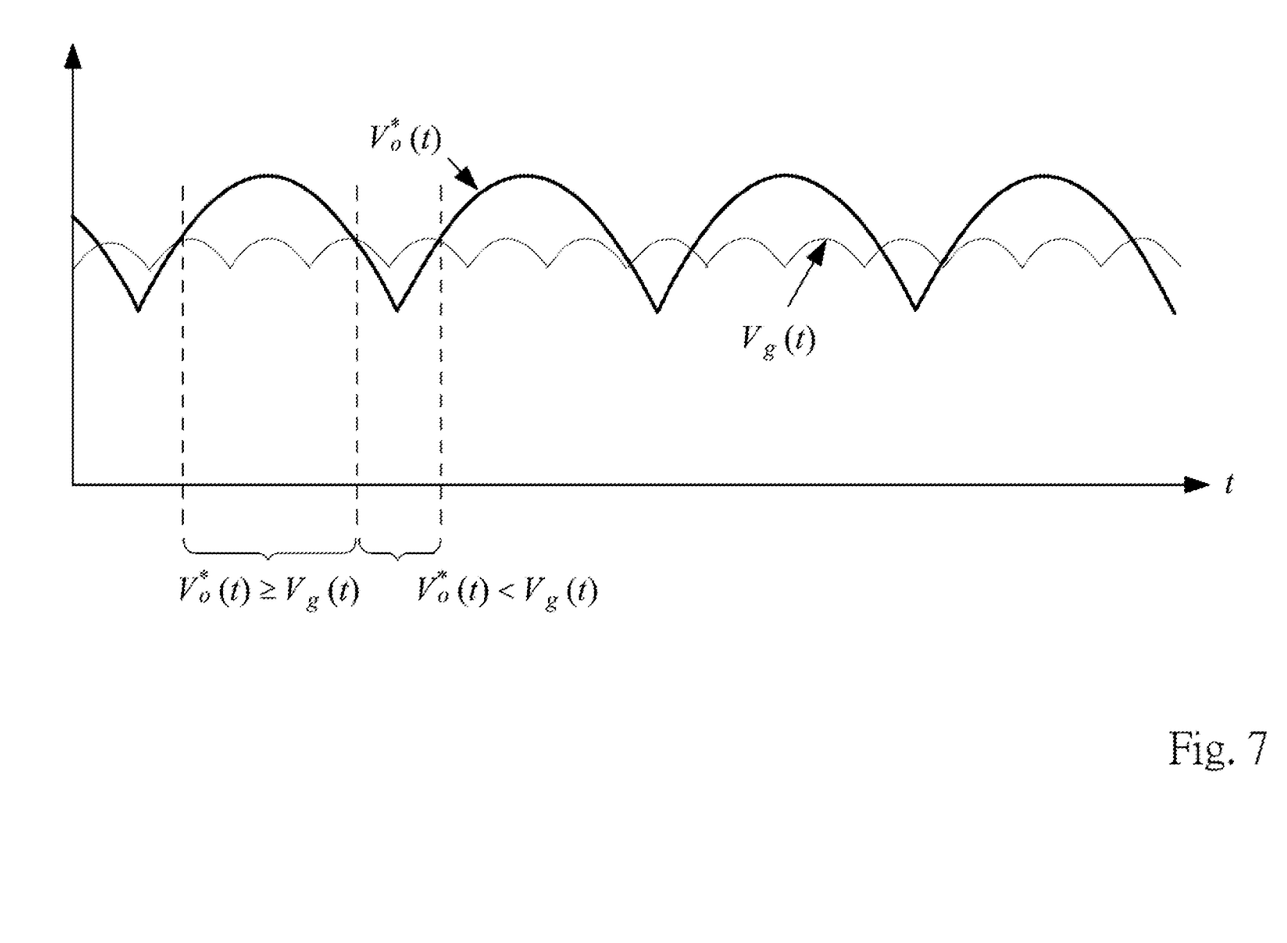
FIG. 7 is a graph showing the determination of step-up/step-down circuit operating mode, for the capacitor having lore capacitance value of FIG. 3.

FIG. 7 is a graph showing the determination of the step-up/step-down circuit 110 operating mode, for the capacitor C having low capacitance value of FIG. 3. In FIG. 7, a step-up mode or a step-down mode of the step-up/step-down circuit 110 can be chosen by the voltage controller 100. The pulse-width signal generator 104 decides the first power transistor $Q_1$ and the second power transistor $Q_2$ to be turned on or turned off in accordance with the voltage command $V_o^*$ and the first DC voltage $V_g$. When the voltage command $V_o^*$ is greater than or equal to the first DC voltage $V_g$, the step-up/step-down circuit 110 is operated in the step-up mode. The first power transistor $Q_1$ is turned on, and the second power transistor $Q_2$ is controlled in accordance with the calculated result of the voltage compensator 101 to be turned on or turned off via the pulse-width signal generator 104, so that the second DC voltage $V_o$ is adjusted to approach the voltage command $V_o^*$. On the other hand, when the voltage command $V_o^*$ is less than the first DC voltage $V_g$, the step-up/step-down circuit 110 is operated in the step-down mode. The second power transistor $Q_2$ is turned off, and the first power transistor $Q_1$ is controlled in accordance with the calculated result of the voltage compensator 101 to be turned on or turned off via the pulse-width signal generator 104, so that the second DC voltage $V_o$ is adjusted to approach the voltage command $V_o^*$. The aforementioned second DC voltage $V_o$ approaching the voltage command $V_o^*$ means that the waveform, magnitude and frequency of the second DC voltage $V_o$ all approach the voltage command $V_o^*$ thereof.

Figure 8:
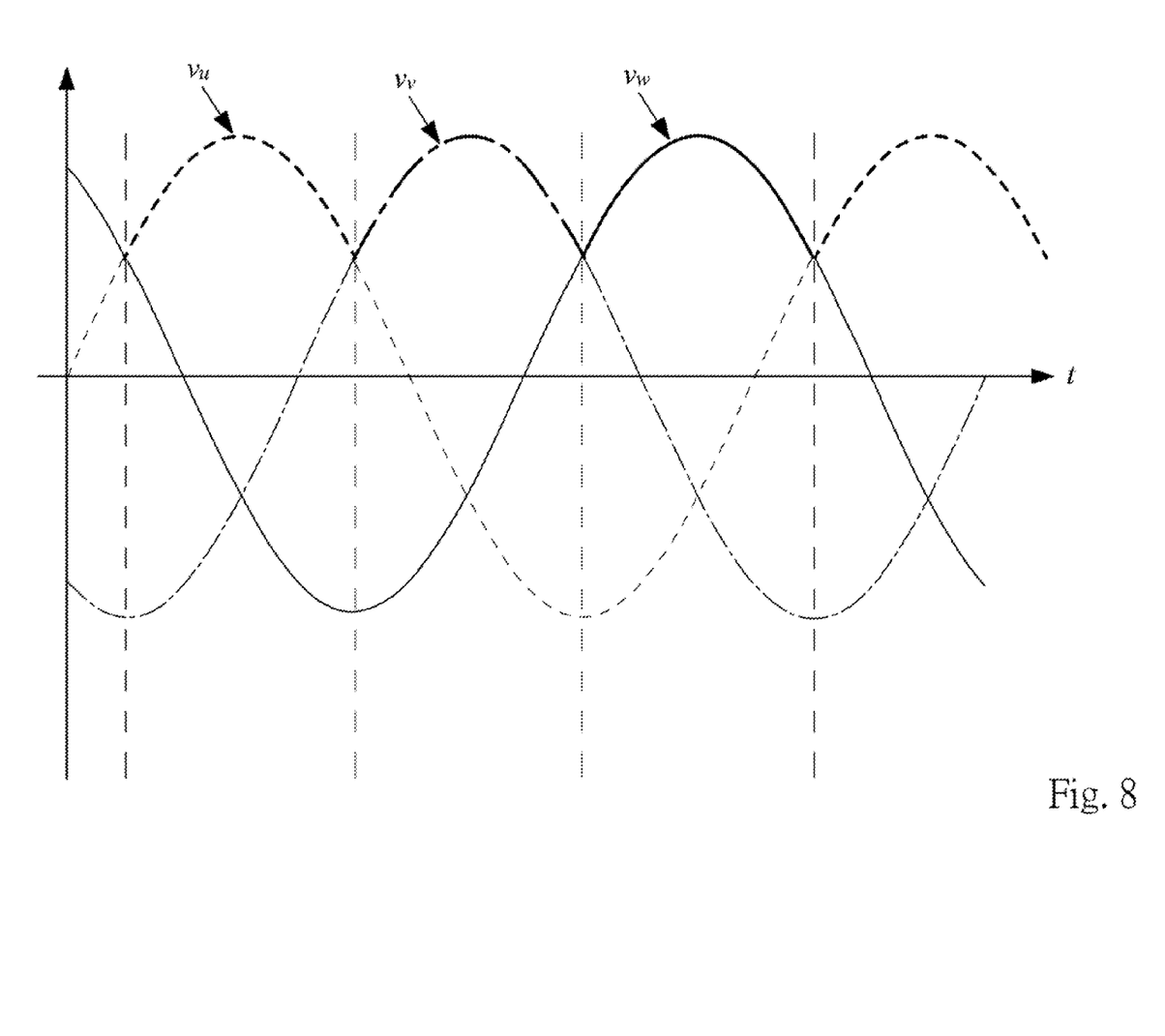
FIG. 8 depicts the operation of power transistors in the AC driving circuit with the semi-sinusoidal waveform control, for the capacitor having low capacitance value of FIG. 3.

FIG. 8 is a graph showing three-phase voltages $v_u$, $v_v$, $v_w$ of an AC driving circuit 210 with the semi-sinusoidal waveform control, for the capacitor C having low capacitance value of FIG. 3. In FIGS. 3 and 8, the AC driving circuit 210 is controlled by the AC motor controller 200 for driving an AC motor 220. The AC driving circuit 210 includes three pairs of power transistors ($Q_{u+}$, $Q_{u-}$), ($Q_{v+}$, $Q_{v-}$), ($Q_{w+}$, $Q_{w-}$), a positive terminal and a negative terminal. Each pair of the power transistors includes a positive power transistor ($Q_{u+}$, $Q_{v+}$, or $Q_{w+}$) connecting to the positive terminal and a negative power transistor ($Q_{u-1}$, $Q_{v-}$, or $Q_{w-}$) connecting to the negative terminal. The three-phase voltage commands $v_u^*$, $v_v^*$, $v_w^*$ generated from the AC motor controller 200 control these three pairs of power transistors ($Q_{u+}$, $Q_{u-}$), ($Q_{v+}$, $Q_{v-}$), ($Q_{w+}$, $Q_{w-}$) respectively to be turned on or turned off. The three-phase voltage commands $v_u^*$, $v_v^*$, $v_w^*$ equal to the three-phase voltages $v_u$, $v_v$, $v_w$ respectively generated from the AC driving circuit 210. The control method is described as follows.

(i) When $V_o^*$ is equal to $v_u^*$ at phase angles between 30 degrees and 150 degrees, the positive power transistor $Q_{u+}$ is turned on, and the negative power transistor $Q_{u-}$ is turned off. The rest four transistors remain the operation states of common motor control scheme.

(ii) When $V_o^*$ is equal to $v_v^*$ at phase angles between 30 degrees and 150 degrees, the positive power transistor $Q_{v+}$ is turned on, and the negative power transistor $Q_{v-}$ is turned off. The rest four transistors remain the operation states of common motor control scheme.

(iii) When $V_o^*$ is equal to $v_w^*$ at phase angles between 30 degrees and 150 degrees, the positive power transistor $Q_{w+}$ is turned on, and the negative power transistor $Q_{w-}$ is turned off. The rest four transistors remain the operation states of common motor control scheme.

According to the above description, the switch of the power transistor in the AC driving circuit 210 can be reduced, so that the present disclosure can increase efficiency of the AC motor driving system.

According to the aforementioned embodiments and examples, the advantages of the present disclosure are described as follows.

1. The AC motor driving system and method thereof of the present disclosure can use the system controller combined with three-stage circuits connected in series to effectively control the step-up/step-down circuit and the AC driving circuit for generating the second DC voltage having the semi-sinusoidal waveform. The switching loss of the power transistor in the AC driving circuit can be reduced, and the efficiency of the AC motor driving system may be improved.

2. The AC motor driving system and method thereof of the present disclosure can use the capacitor having low capacitance to effectively increase the power factor and extend the life of the AC driving circuit.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An AC motor driving method, comprising:
rectifying a mains supply to a first DC voltage via a three-phase full-wave rectifier circuit;
supplying the first DC voltage to a step-up/step-down circuit and a voltage controller, wherein the step-up/step-down circuit is controlled by the voltage controller to generate a second DC voltage having a semi-sinusoidal waveform;
supplying the second DC voltage to the voltage controller;
generating an electrical angle by an AC motor controller, wherein the electrical angle is supplied to a voltage command generator;
generating a voltage command by the voltage command generator, and supplying the voltage command to the voltage controller; and
comparing the second DC voltage with the voltage command by the voltage controller, wherein if the second DC voltage and the voltage command are different, the voltage controller generates a plurality of signals to drive the step-up/step-down circuit for adjusting the second DC voltage to approach the voltage command;
wherein the step-up/step-down circuit comprises a first power transistor and a second power transistor; when the voltage command is greater than or equal to the first DC voltage, the step-up/step-down circuit is operated in a step-up mode, the first power transistor is turned on, and the second power transistor is controlled to perform a pulse width modulation for adjusting the second DC voltage to approach the voltage command in accordance with a compensation result calculated by the voltage controller; when the voltage command is less than the first DC voltage, the step-up/step-down circuit is operated in a step-down mode, the second power transistor is turned off, and the first power transistor is controlled to perform a pulse width modulation for adjusting the second DC voltage to approach the voltage command in accordance with the compensation result calculated by the voltage controller.

2. The AC motor driving method of claim 1, further comprising:
controlling an AC driving circuit to drive an AC motor by the AC motor controller.

3. The AC motor driving method of claim 2, wherein the AC driving circuit comprises three pairs of power transistor, a positive terminal and a negative terminal, and each pair of the power transistors comprises a positive power transistor connecting to the positive terminal and a negative power transistor connecting to the negative terminal, and the AC motor driving method further comprising:
adjusting three-phase voltage commands of the AC motor via the voltage command for controlling three pairs of power transistors to be turned on or turned off, respectively.

4. The AC motor driving method of claim 3, wherein adjusting the phase voltage commands of the AC motor via the voltage command is comparing each of the three-phase voltage commands with the voltage command, when the voltage command is equal to one of the three-phase voltage commands at phase angles between 30 degrees and 150 degrees, the positive power transistor of a corresponding pair of power transistors is turned on, and the negative power transistor of the corresponding pair of power transistors is turned off.

5. An AC motor driving system, comprising:
a three-phase full-wave rectifier circuit rectifying a mains supply to a first DC voltage;
a step-up/step-down circuit controlled by a voltage controller to generate a second DC voltage having a semi-sinusoidal waveform, wherein the first DC voltage is supplied to the step-up/step-down circuit, and the second DC voltage is supplied to the voltage controller;
an AC motor controller generating an electrical angle; and a voltage command generator generating a voltage command with inputting the electrical angle to the voltage command generator, and the voltage command is supplied to the voltage controller;

wherein the second DC voltage is compared with the voltage command by the voltage controller, if the second DC voltage and the voltage command are different, the voltage controller generates a plurality of signals to drive the step-up/step-down circuit for adjusting the second DC voltage to approach the voltage command;

wherein the step-up/step-down circuit comprises a first power transistor and a second power transistor, and the voltage controller comprises at least a voltage compensator and a pulse-width signal generator;

wherein the pulse-width signal generator decides the first power transistor and the second power transistor to be turned on or turned off in accordance with the voltage command and the first DC voltage; when the voltage command is greater than or equal to the first DC voltage, the step-up/step-down circuit is operated in a step-up mode, the first power transistor is turned on, the second power transistor is controlled to perform an on/off pulse width modulation via the pulse-width signal generator for adjusting the second DC voltage to approach the voltage command in accordance with a compensation result calculated by the voltage compensator; when the voltage command is less than the first DC voltage, the step-up/step-down circuit is operated in a step-down mode, the second power transistor is turned off, the first power transistor is controlled to perform a pulse width modulation for adjusting the second DC voltage to approach the voltage command in accordance with the compensation result calculated by the voltage controller.

6. The AC motor driving system of claim 5, further comprising:

an AC driving circuit controlled by the AC motor controller to drive an AC motor.

7. The AC motor driving system of claim 6, further comprising:

a capacitor having low capacitance to stabilize the second DC voltage and providing a reactive power to the AC motor.

8. The AC motor driving system of claim 6, wherein the AC driving circuit comprises three pairs of power transistors, a positive terminal and a negative terminal, each pair of the power transistors comprises a positive power transistor connecting to the positive terminal and a negative power transistor connecting to the negative terminal, and the voltage command adjusts three-phase voltage commands of the AC motor for controlling three pairs of power transistors to be turned on or turned off, respectively.

9. The AC motor driving system of claim 8, wherein each of the three-phase voltage commands is compared with the voltage command, when the voltage command is equal to one of the three-phase voltage commend phase angles between 30 degrees and 150 degrees, the positive power transistor of a corresponding pair of power transistors is turned on, and the negative power transistor of the corresponding pair of power transistors is turned off.

* * * * *